United States Patent
Proefrock et al.

(10) Patent No.: US 7,560,829 B2
(45) Date of Patent: Jul. 14, 2009

(54) POWER SYSTEM USING MULTIPLE BATTERY PACK TYPES

(75) Inventors: Wayne Proefrock, Hillsboro, OR (US); Thovane Solivan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 11/027,644

(22) Filed: Dec. 31, 2004

(65) Prior Publication Data

US 2006/0145538 A1 Jul. 6, 2006

(51) Int. Cl.
 *H02J 1/00* (2006.01)
 *H02J 3/00* (2006.01)

(52) U.S. Cl. .......................... 307/18; 307/72

(58) Field of Classification Search .................... 307/44, 307/46, 18, 75, 72, 80
 See application file for complete search history.

(56) References Cited

U.S. PATENT DOCUMENTS

| | | | |
|---|---|---|---|
| 3,319,175 A | 5/1967 | Dryden | |
| 5,801,514 A * | 9/1998 | Saeki et al. | 320/136 |
| 5,959,368 A | 9/1999 | Kubo et al. | |
| 6,140,799 A * | 10/2000 | Thomasson | 320/117 |
| 6,571,091 B1 | 5/2003 | Janssen et al. | |
| 2004/0113585 A1 | 6/2004 | Stanesti et al. | |
| 2004/0178766 A1 | 9/2004 | Bucur et al. | |

FOREIGN PATENT DOCUMENTS

| | | |
|---|---|---|
| EP | 0 624 944 | 7/1998 |
| JP | 6-327163 | 11/1994 |
| JP | 9-46914 | 2/1997 |
| WO | WO 9510082 | 4/1995 |
| WO | WO 00/21178 A | 4/2000 |

OTHER PUBLICATIONS

International Search Report for corresponding matter P20332PCT dated Jan. 30, 2008.
English Translation of Japanese Office Action for corresponding matter.

* cited by examiner

*Primary Examiner*—Albert W Paladini
*Assistant Examiner*—Michael Rutland Wallis
(74) *Attorney, Agent, or Firm*—Robert A. Diehl (57) ABSTRACT

A power system can include a first battery port to couple to a first type of battery pack having a first battery voltage range, a second battery port to couple to a second type of battery pack having a second battery voltage range that is different from the first battery voltage range, a first power rail to couple to a first set of loads, a second power rail to couple to a second set of loads, and a switch circuit. The switch circuit can provide a number of switch settings. The switch settings can include a first setting to couple the first battery port to the first power rail and the second battery port to the second power rail, a second setting to couple the first battery port to both the first power rail and the second power rail, and a third setting to couple the second battery port to both the first power rail and the second power rail.

21 Claims, 7 Drawing Sheets

POWER SYSTEM USING MULTIPLE BATTERY PACK TYPES

FIELD OF THE INVENTION

The present invention relates to the field of power systems. More specifically, the present invention relates to a power system that can use multiple types of battery packs.

BACKGROUND

A variety of electronic devices use battery packs, including notebook computers, cellular phones, personal data assistants, and the like. A battery pack usually includes a number of battery cells. A variety of battery cell technologies are available, and new technologies are constantly being developed. One example commonly used today is the Lithium-ion battery cell. A Lithium ion battery cell can usually be safely charged up to about 4.2 volts, and can usually be safely discharged down to about 3 volts. Other battery technologies can provide different voltage ranges. Battery packs often include protection circuitry intended to maintain safe voltage ranges in the battery cells.

Depending on how battery cells are arranged, battery packs can support different voltage ranges and power requirements. For example, a battery pack commonly used in notebook computers may include six Lithium-ion battery cells, arranged in two parallel groups of three cells connected in series. Since voltages add when cells are connected in series, the voltage range for this three series, Lithium-ion battery pack may be about 12.6 volts (4.2 volts per cell) when fully charged, down to about 9 volts (3 volts per cell) when depleted. The voltage range can be increased or decreased by adding or removing cells in series. The number of parallel groupings determines how much current the battery pack can provide, with more parallel groupings able to support higher current rates or longer battery life at fixed current rates.

Many electronic devices can be designed to operate using any one of a variety of battery pack configurations. For example, some notebook computers have been designed to use three series battery packs, and some notebook computers have been designed to use two series battery packs. There may be trade-offs among different battery pack configurations. For example, some components, or loads, in a notebook computer may operate more efficiently, or be easier or less expensive to implement, using a two series battery pack, while other loads may operate more efficiently, or be easier or less expensive to implement, using a three series battery pack.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. It is well understood by those skilled in the art that these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention include power systems for electronic devices that can use multiple types of battery packs simultaneously or in the alternative. By using multiple battery types simultaneously, embodiments of the present invention can match battery voltage ranges to types of loads within an electronic device for which a given battery voltage is more efficient, or otherwise beneficial, potentially improving battery life. Furthermore, by using multiple battery packs in the alternative, embodiments of the present invention can power an electronic device when at least one of the multiple types of battery packs are available.

Figure 1:
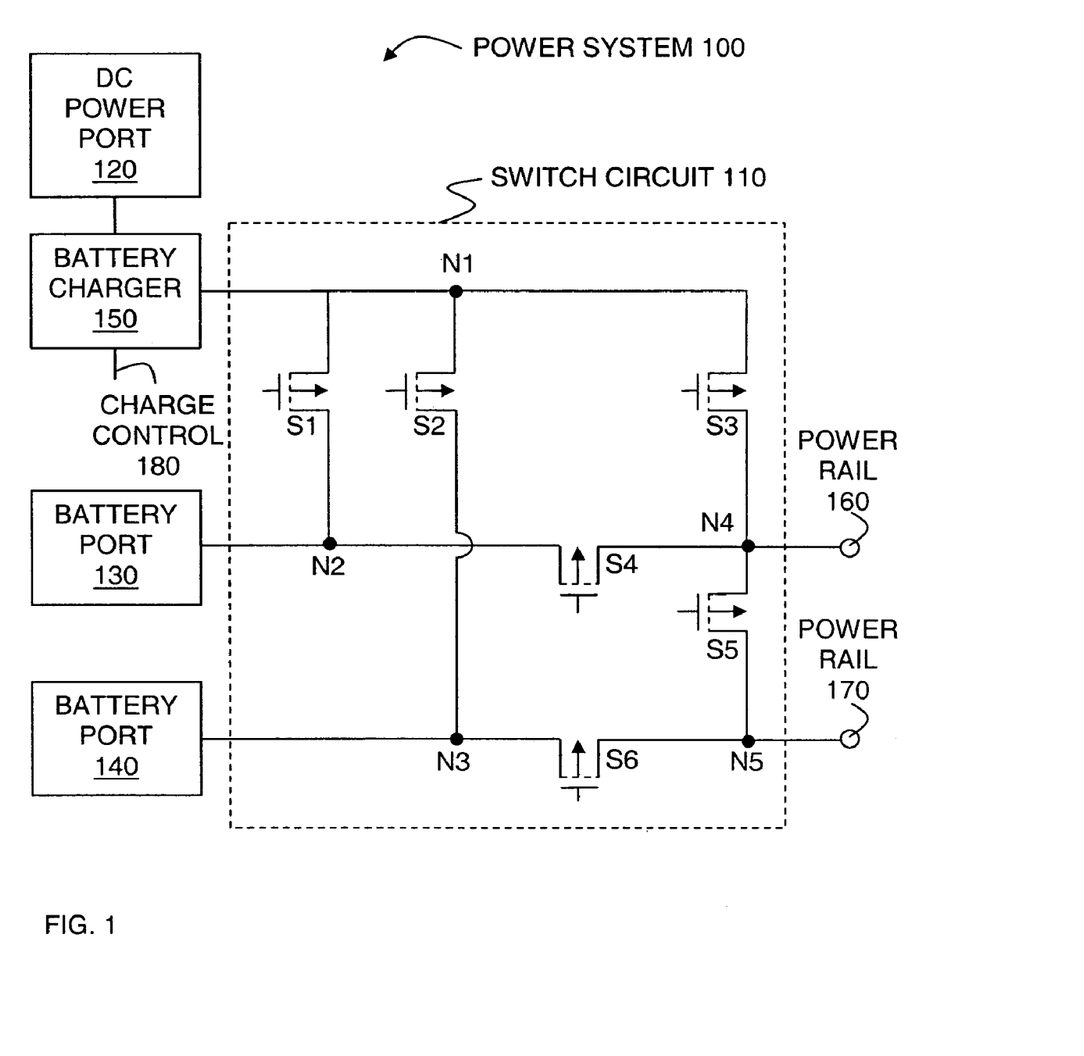
FIG. 1 illustrates one embodiment of a power system.

For example, FIG. 1 illustrates a power system 100, according to one embodiment of the present invention. Power system 100 can include a switch circuit 110 to selectively couple three different power ports, DC power port 120, battery port 130, and battery port 140, to two different power rails, power rail 160 and power rail 170. Battery port 130 can support a different type of battery pack than battery port 140 so that the ports 130 and 140 can provide two different battery voltages. Power rail 160 can be coupled to a number of loads (not shown), some of which may operate more efficiently using the type of battery pack supported by battery port 130. Power rail 170 can be coupled to other loads (not shown), some of which may operate more efficiently using the type of battery pack supported by battery port 140.

When a DC power source is not available at DC power port 120, and battery packs are available at both battery ports 130 and 140, switch circuit 110 can open switches S1, S2, S3, and S5, and close switches S4 and S6 to provide power rail 160 with a battery voltage from port 130 and power rail 170 with a battery voltage from port 140. This could be the most efficient mode of operation for power system 100, with each power rail 160 and 170 providing a voltage range targeted for a respective set of loads.

If the battery pack at port 130 is then disconnected or becomes depleted, switch circuit 110 can then open switch S4 and close switch S5 to power both power rails 160 and 170 with the battery voltage from port 140. On the other hand, if the battery pack at port 130 remains available but the battery pack at port 140 is disconnected or becomes depleted, switch circuit 110 can open switch S6 and close switch S5 to power both power rails 160 and 170 with the battery voltage from port 130. In other words, as long as at least one battery pack is available, power system 100 can supply power to loads on both power rails 160 and 170. However, power system 100 may be less efficient in either of these two modes of operation because one set of loads may receive a targeted voltage range, but the other set of loads may not.

When DC power is available at DC power port 120, switch circuit 110 can close switches S3 and S5, and open switches S4 and S6 to provide both power rails 160 and 170 with a voltage from the DC source. In other words, when power system 100 is plugged into an AC outlet, an AC-to-DC adapter provide a DC source, and power system 100 can supply power to all the loads using the DC source. The voltage from the DC source may depend on whether or not a battery pack is being recharged, and, if a battery pack is being recharged, what type of the battery pack it is.

For example, battery charger 150 may be capable of converting a voltage from a DC power source into multiple voltages. For instance, charger 150 may be able to provide the recharging voltage for a two series Lithium-ion battery pack (usually about 8.4 volts), as well as the recharging voltage for a three series Lithium-ion battery pack (usually about 12.6 volts). A charge control input 180 on battery charger 150 could indicate which of these two recharging voltages to provide.

If a depleted battery pack is coupled to port 130, and either no battery pack is coupled at port 140 or a battery pack at port 140 is fully charged, battery charger 150 may provide the appropriate recharging voltage for the type of battery supported by port 130. In which case, switch circuit 110 can close switch S1 and open switch S2 to recharge the battery pack at port 130.

On the other hand, if a depleted battery pack is coupled to port 140, and either no battery pack is coupled to port 130 or a battery pack at port 130 is fully charged, battery charger 150 may provide the appropriate recharging voltage for the type of battery supported by port 140. In which case, switch circuit 110 can close switch S2 and open switch Si to recharge the battery pack at port 140.

If both ports 130 and 140 are coupled to depleted battery packs, any number of techniques could be used to decide which one to recharge first. For example, one port may be given priority based on speed of recharging, the efficiency of all the loads when using just one battery, level of depletion, etc. In some embodiments, recharging may switch back and forth between batteries at intervals or at particular levels of charge.

If both ports 130 and 140 are coupled to fully charged battery packs, or battery packs are not coupled to both ports 130 and 140, switch circuit 110 can open both switches S1 and S2, and any number of techniques can be used to select what voltage the battery charger 150 should provide to power rails 160 and 170. In one embodiment, one of the recharging voltages may be given priority over the other one based on some criteria, such as the efficiency of all the loads when using one recharging voltage compared to another voltage. In another embodiment, battery charger 150 may simply provide the most recently used recharging voltage. In yet another embodiment, battery charger 150 may provide an entirely different voltage, possibly at some level between the recharging voltages.

Figure 2:
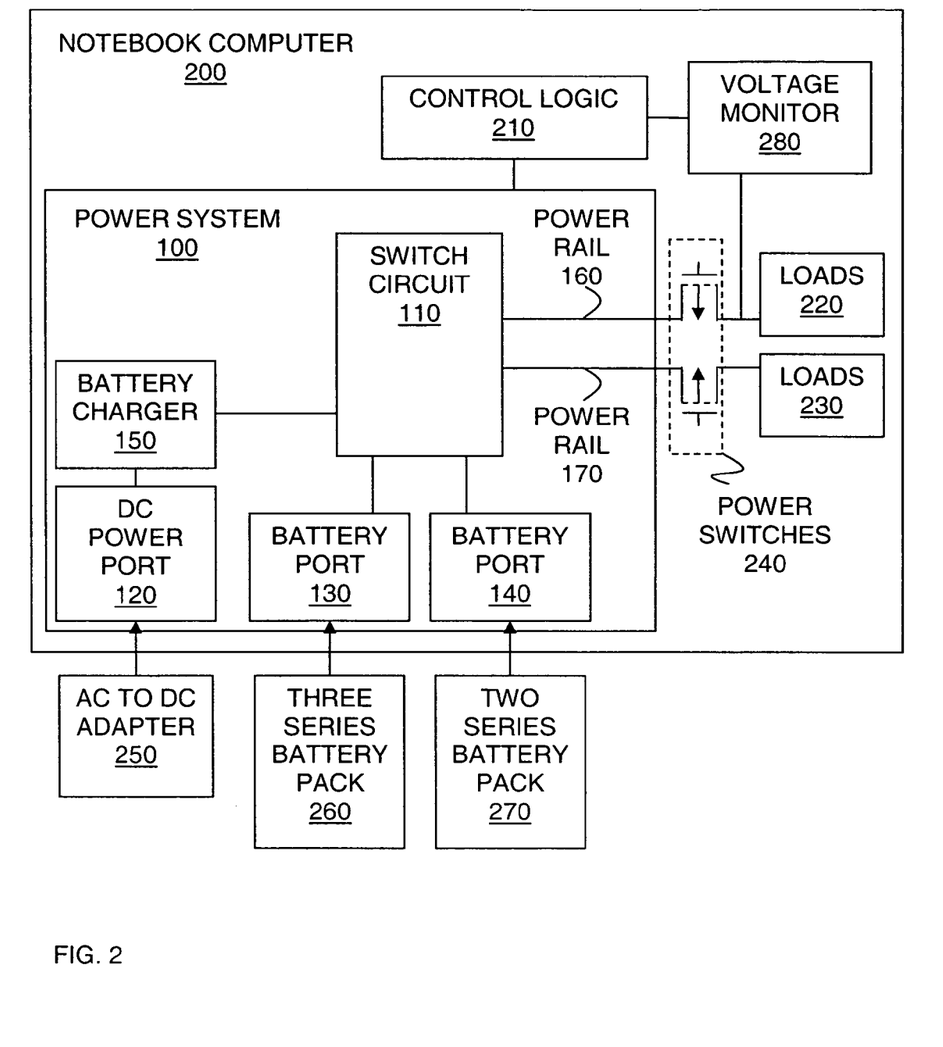
FIG. 2 illustrates one embodiment of a notebook computer.

Power system 100 can be used in a wide variety of electronic devices, including notebook computers, cellular phones, personal data assistants, etc. For example, FIG. 2 illustrates one embodiment of power system 100 in a notebook computer 200. An AC-to-DC power adapter 250 can convert an AC voltage to a DC voltage and provide the DC voltage to DC power port 120. Battery port 130 can support a three-series battery pack 260. Battery port 140 can support a two series battery pack 270.

Power system 100 may supply power to many different loads within notebook 200. The loads can be divided into two groups, loads 220 and 230, to match them with whichever battery port is likely to provide more benefit. The loads may include things like voltage regulators to generate a variety of system voltages, such as 5 volts, 3.3 volts, 2.5 volts, and 1.5 volts, as well as voltages for particular components, such as a display, a memory controller hub, an input/output controller hub, a central processing unit, and the like. In one embodiment, the loads with lower voltage requirements may be matched to the battery port that supports the lower voltage range, port 140 supporting the two series battery pack 270 in the illustrated embodiment. And, the loads with higher voltage requirements may be matched to the battery port that supports the higher voltage range, port 130 supporting the three series battery pack 260 in the illustrated embodiment.

Notebook 200 can include control logic 210 that can monitor various conditions, such as the availability of the power sources and the level of charge in any available battery packs. Based on these and other conditions, control logic 210 can provide appropriate control signals to switch circuit 110 and battery charger 150 to selectively couple one or more of the power sources to the loads. Control logic 210 can be implemented in any of a variety of different ways, including hardware, firmware, software, or any combination thereof.

Voltage monitor 280 can monitor a voltage level on power rail 160 for a potential voltage droop condition, and then trigger a shut-down operation in notebook 200. Voltage droop can occur when a battery voltage drops too low to support a load. For example, if a load is a voltage regulator that generates a constant 5 volt output and consumes 1.2 volts in the process, a voltage rail that powers the voltage regulator may need to provide at least 6.2 volts. If the voltage rail drops below 6.2 volts, the voltage regulator may not be able to maintain the 5 volt output. In other words, the 5 volt output may "droop" if the voltage rail fails to provide enough voltage "overhead" to power the voltage regulator. Voltage droop can have serious consequences in many electronic devices, potentially causing any of a variety of errors.

In FIG. 2, if battery pack 260 includes Lithium-ion battery cells with operating ranges of 4.2 volts to 3 volts, the voltage range for battery pack 260 would be about 12.6 volts to 9 volts. And, if battery pack 270 includes the same type of Lithium-ion battery cells, its voltage range would be about 8.6 volts to 6 volts. Then, voltage droop could occur if battery pack 270 were to drop down to 6 volts while powering a 5 volt voltage regulator with a 1.2 volt overhead. On the other hand, voltage droop would be much less likely using battery pack 260 because its entire voltage range is above the minimum voltage needed by the voltage regulator.

When both battery packs 260 and 270 are available, the 5 volt voltage regulator could be included among loads 220 that are powered by the three series battery pack 260 to avoid voltage droops. When only battery pack 270 is available, and both sets of loads 220 and 230 are powered by battery pack 270, voltage monitor 280 can monitor the voltage on rail 160, compare it to some voltage droop threshold, and trigger a shut-down operation before a voltage droop is likely to occur. For example, if the highest voltage requirement among loads 220 is 6.2 volts, voltage monitor 280 may use a threshold greater than 6.2 volts, such as 6.25 volts.

FIG. 2 also shows power switches 240 in power rails 160 and 170. In one embodiment, power switches 240 can be used to turn notebook 200 on and off by coupling or decoupling power system 100 with loads 220 and 230.

Figure 3:
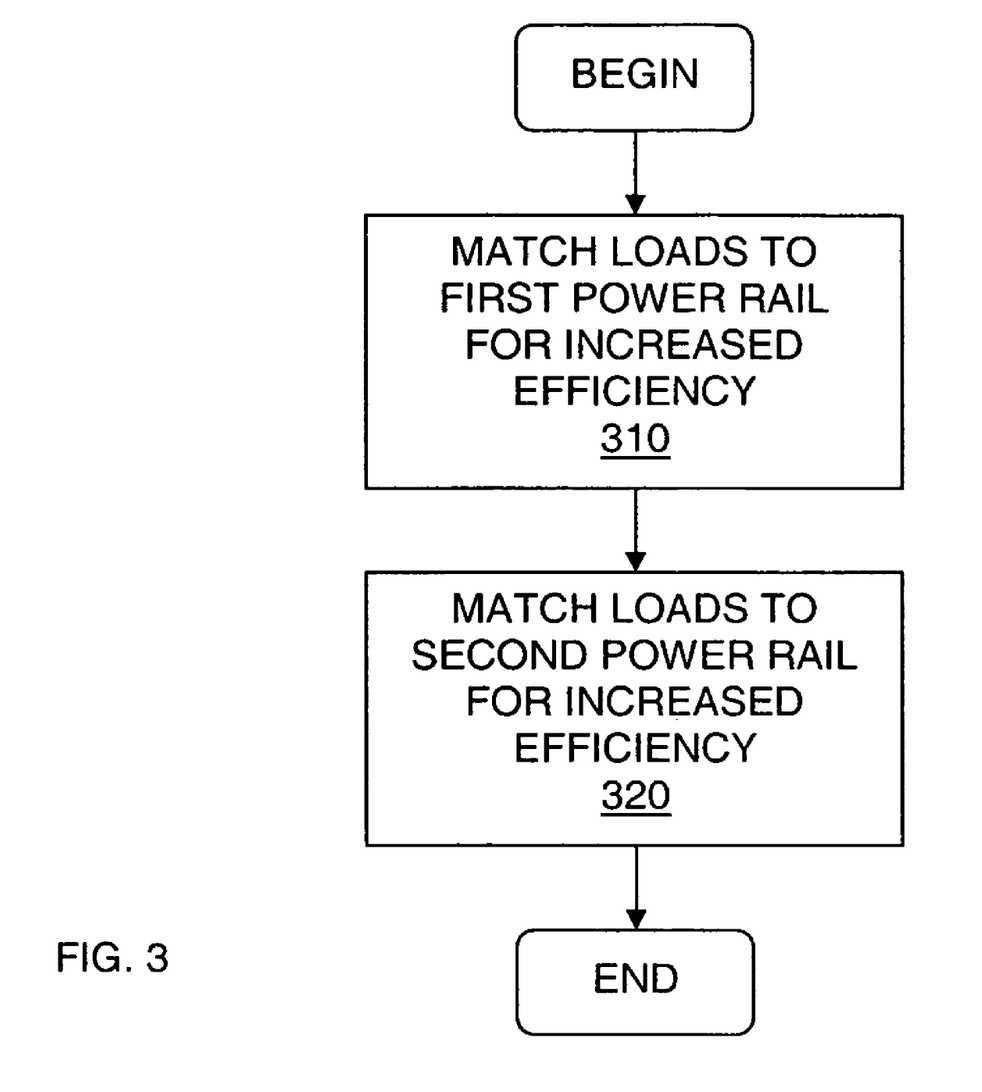
FIG. 3 illustrates one embodiment of a method for matching loads to power rails.

FIGS. 3-6 illustrate flow-charts that show how some of the functions described above can be implemented. FIG. 3 illustrates an embodiment of the present invention for matching a first set of loads to a first power rail at 310, and matching a second set of loads to a second power rail at 320. Any number of criteria can be used to match loads to power rails.

In one example where two battery packs are available, each battery pack could power one of the two power rails. If each battery pack has a different voltage range, some portion of the loads may be more efficient, or easier to implement, using one of the voltage ranges. In which case, these loads could be matched based on efficiency. Any remaining loads could be divided between the power rails based on the power capabilities of the battery packs. For instance, if both battery packs can support the same power requirements, then the loads could be balanced to some extent between the two power rails. If one battery pack can support more load than the other, a larger portion of the total load could be matched to the corresponding power rail.

Figure 4:
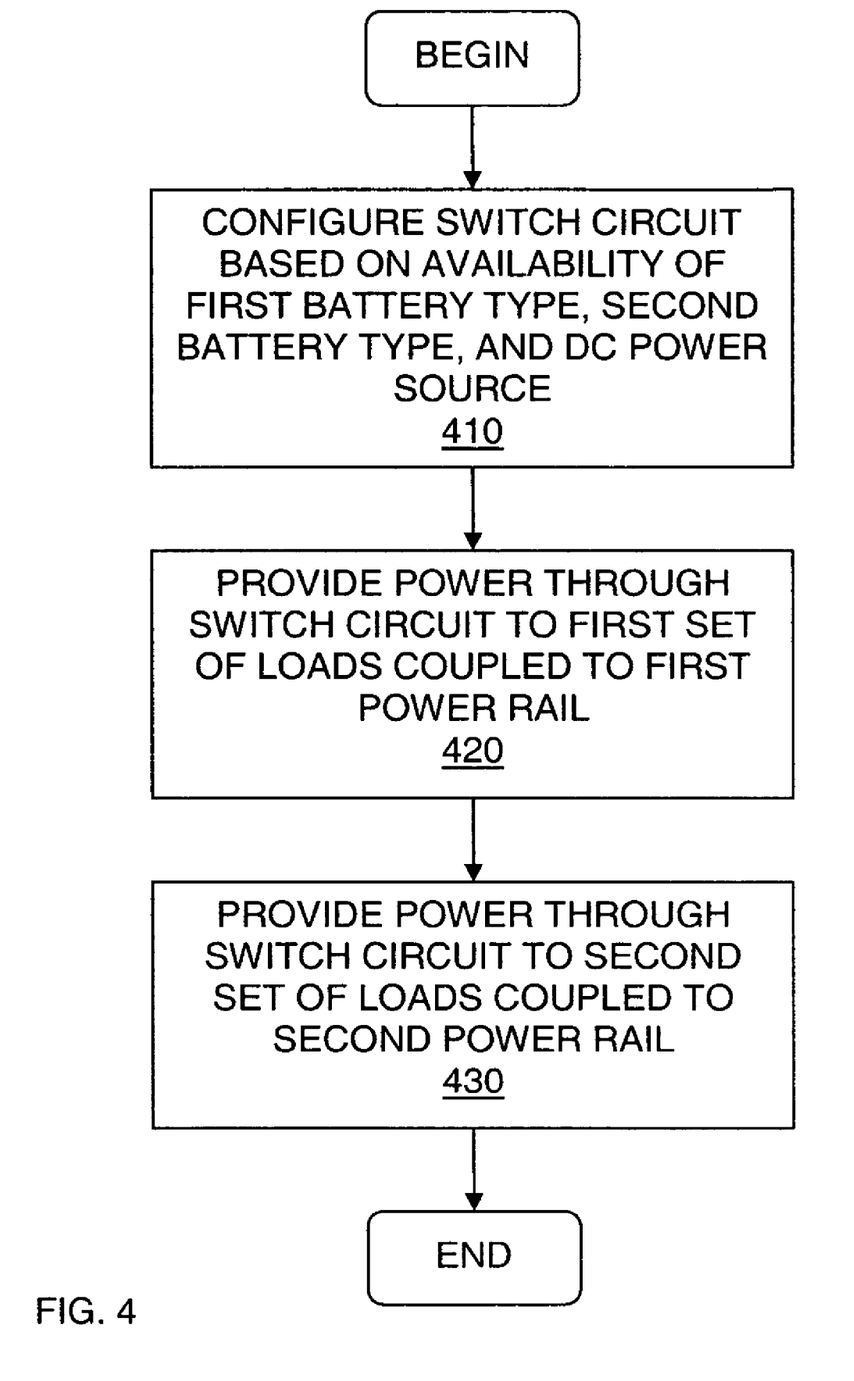
FIG. 4 illustrates one embodiment of a method for operating a power system.

FIG. 4 illustrates a method for operating a power system, according to one embodiment of the present invention. At 410, the method can configure a switch circuit based on various criteria, such as the availability of a DC power source, as well as the availability and charge level of two different types of battery packs. Any number of techniques can be used to configure the switch circuit. An example is described below in FIG. 5.

Continuing with FIG. 4, once the switch circuit has been configured, the method can provide power through the switch circuit to a first set of loads coupled to a first power rail at 420, and provide power through the switch circuit to a second set of loads coupled to a second power rail at 430.

The method of FIG. 4 could be repeated every time there is a change in the criteria used to configure the switch circuit. For example, if the availability changes for the DC power source or either of the battery packs, the switch circuit could be reconfigured. Similarly, if one or both of the battery packs becomes depleted or fully recharged, the switch circuit could be reconfigured.

Figure 5:
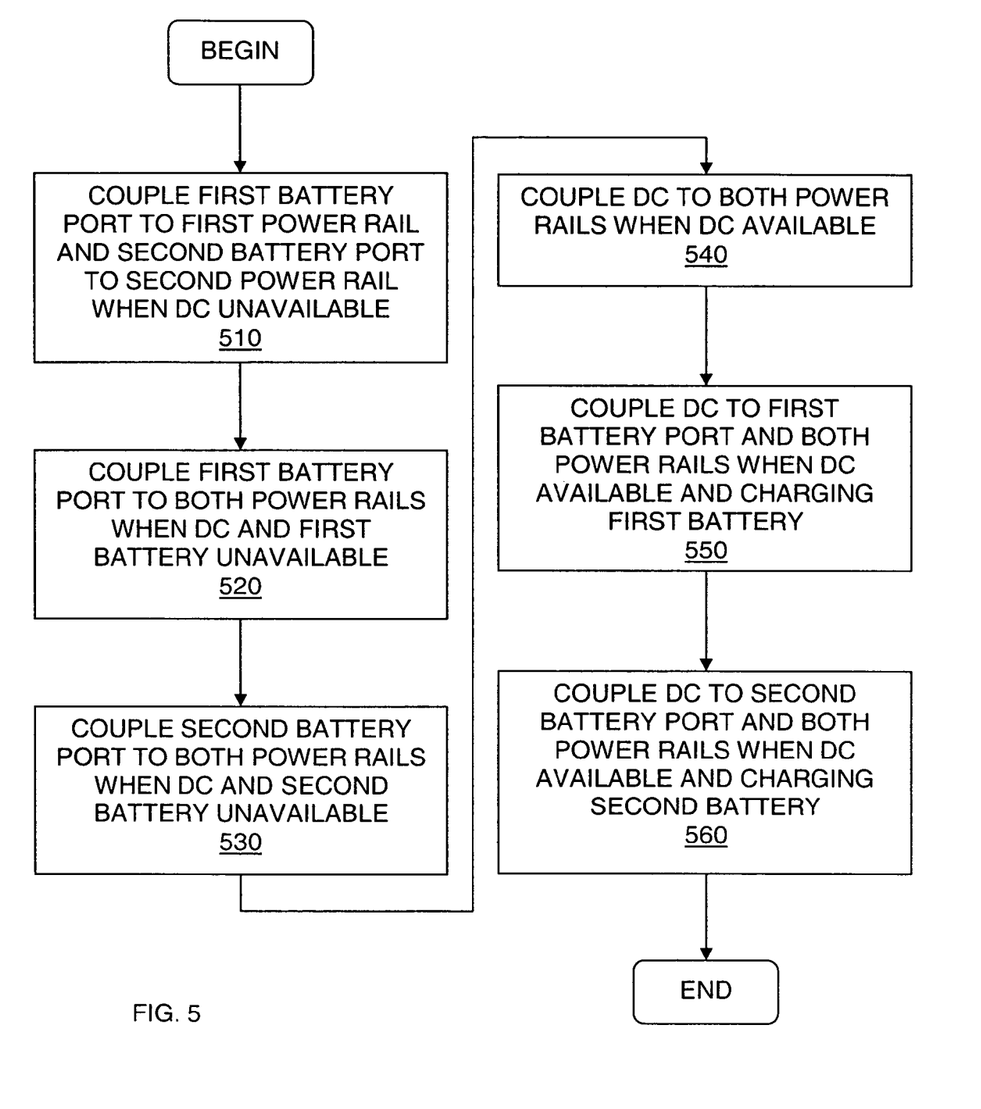
FIG. 5 illustrates one embodiment of a method for configuring a switch circuit.

FIG. 5 illustrates one example of a method for configuring a switch circuit based on power source availability and charge level. At 510, the method can couple a first battery port to a first power rail, and a second battery port to a second power rail, when a DC power source is unavailable at a DC power port, a first type of battery pack is available and at least partially changed at the first battery port, and a second type of battery pack is available and at least partially charged at the second battery port.

At 520, the method can couple the first battery port to both the first power rail and the second power rail when the DC power source is unavailable, the second type of battery pack is unavailable or depleted, and the first type of battery pack is available and at least partially charged.

At 530, the method can couple the second battery port to both the first power rail and the second power rail when the DC power source is unavailable, the first type of battery pack is unavailable or depleted, and the second type of battery pack is available and at least partially charged.

At 540, the method can couple the DC power port to both the first power rail and the second power rail when the DC power source is available and each of the first type of battery pack and the second type of battery pack are unavailable or fully charged.

At 550, the method can couple the DC power port to the first battery port and both the first power rail and the second power rail when the DC power source is available, the first type of battery pack is available and at least partially discharged, and the second type of battery pack is unavailable, fully charged, or waiting to be recharged.

At 560, the method can couple the DC power port to the second battery port and both the first power rail and the second power rail when the DC power source is available, the second type of battery pack is available and at least partially discharged, and the first type of battery pack is unavailable, fully charged, or waiting to be recharged.

Figure 6:
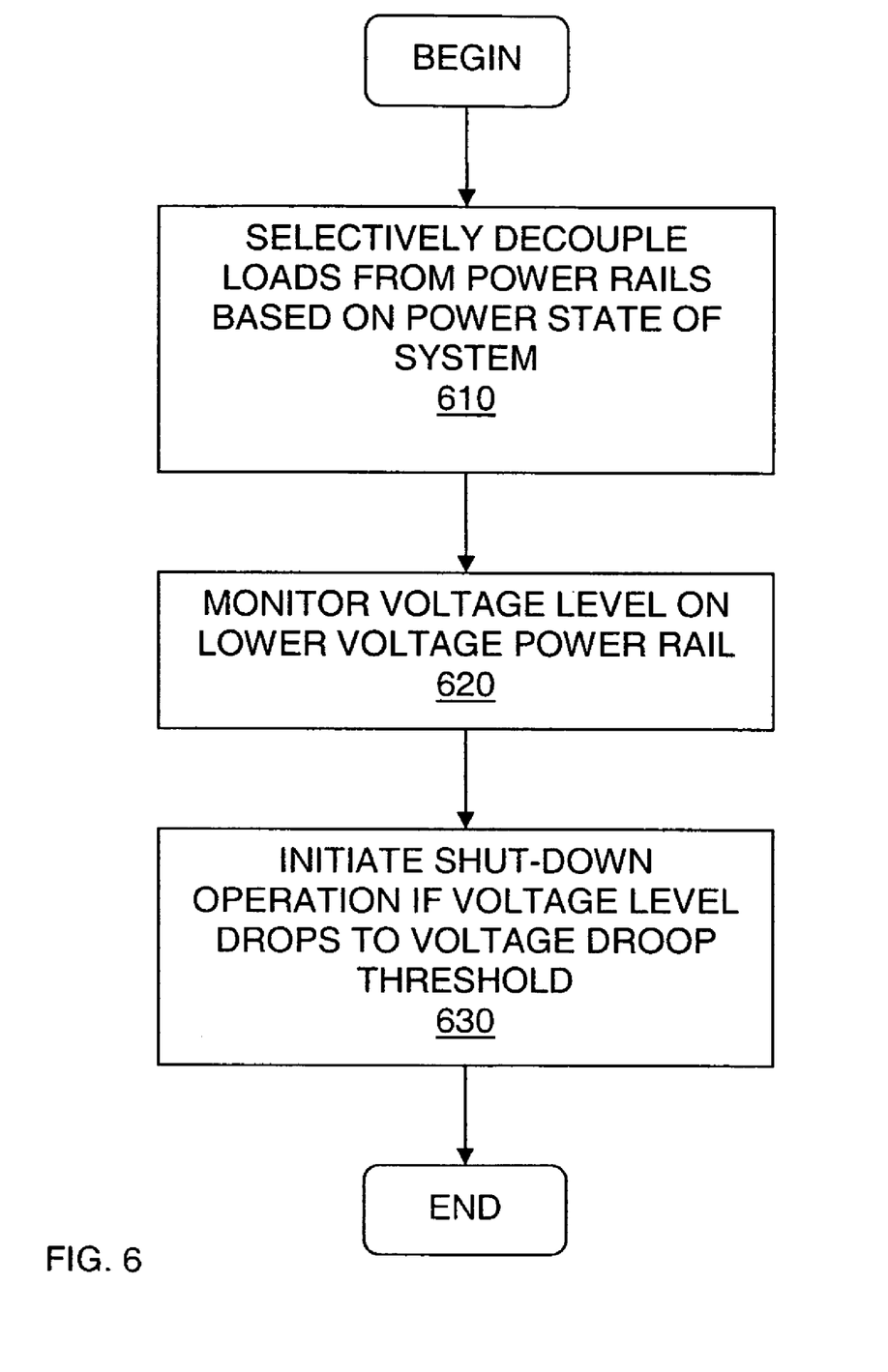
FIG. 6 illustrates another embodiment of a method for configuring a switch circuit.

FIG. 6 illustrates an example of a method for configuring a switch circuit based on additional criteria. At 610, the method can selectively decouple the first set of loads from the first power rail, and the second set of loads from the second power rail, based on a power state of the electronic device in which the switch circuit is being used. At 620, the method can monitor a voltage level on a power rail that is coupled to loads that require higher voltage levels. At 630, the method can initiate a shut-down operation if the voltage level on the power rail drops below a voltage droop threshold. For example, if a battery pack having a lower voltage range is being used to power both power rails, the method can reduce the chances of voltage droop by shutting down the electronic device even before the battery pack is fully depleted.

FIGS. 1-6 illustrate a number of implementation specific details. Other embodiments may not include all the illustrated elements, may arrange the elements differently, may combine one or more of the elements, may include additional elements, and the like.

Embodiments of the present invention can support virtually any type of battery pack, including virtually any battery cell technology and virtually any battery cell configuration, from a single battery cell up to any number of battery cells.

Embodiments of the present invention can also support more than two types of battery packs simultaneously and in the alternative. For example, switch circuit 110 in FIG. 1 could be expanded to selectably couple three, four, or more different battery ports to respective power rails, and loads on each of the power rails could be matched to the respective battery voltage ranges.

Certain embodiments of the present invention may be purely battery powered. In which case, the DC power port 120, battery charger 150, and switches S1, S2, and S3 shown in FIG. 1 may not be needed. In another example, battery charger 150 in FIG. 1 may be replaced by a voltage regulator circuit, a separate battery charging circuit, and a switching network for providing power to the power rails and selectably recharging the battery packs. In yet another embodiment, the control logic 210, voltage monitor 280, and/or power switches 240 shown in FIG. 2 could be located within the power system 100 rather than the notebook computer 200.

Embodiments of the present invention may also be able to reduce the total number of battery cells used to power a particular electronic device. For example, if the power requirements for a particular device could be met using a single 8 cell, 4 series battery pack, an embodiment of the present invention may be able to met the power requirements more efficiently using 7 total cells divided between a 4 cell, 2 series battery pack and a 3 cell, 3 series battery pack. Similarly, where a single 6 cell battery pack could be used, an embodiment of the present invention may be able to meet the same power requirements using 5 battery cells divided between a 3 cell, 3 series battery pack and a 2 cell, 2 series battery pack.

Figure 7:
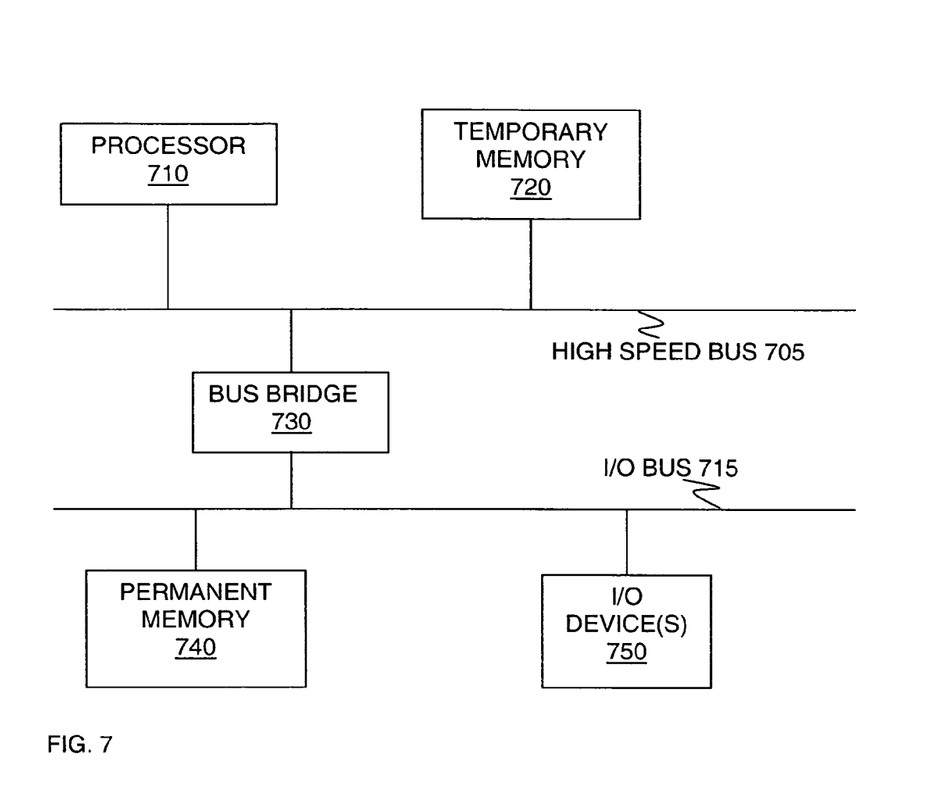
FIG. 7 illustrates one embodiment of a hardware system that can perform various functions of the present invention.

FIG. 7 illustrates one embodiment of a generic hardware system that can bring together the functions of various embodiments of the present invention. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device(s) 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, while other implementations may include one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

Figure 8:
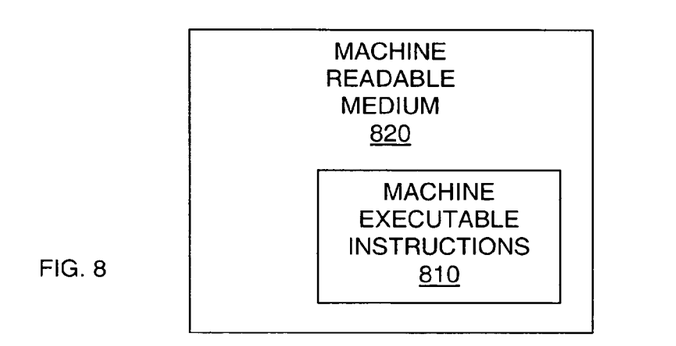
FIG. 8 illustrates one embodiment of a machine readable medium to store instructions that can implement various functions of the present invention.

Various functions of the present invention, as described above, can be implemented using one or more of these hardware systems. In one embodiment, the functions may be implemented as instructions or routines that can be executed by one or more execution units, such as processor 710, within the hardware system(s). As shown in FIG. 8, these machine executable instructions 810 can be stored using any machine readable storage medium 820, including internal memory, such as memories 720 and 740 in FIG. 7, as well as various external or remote memories, such as a hard drive, diskette, CD-ROM, magnetic tape, digital video or versatile disk (DVD), laser disk, Flash memory, a server on a network, etc. In one implementation, these software routines can be written in the C programming language. It is to be appreciated, however, that these routines may be implemented in any of a wide variety of programming languages.

In alternate embodiments, various functions of the present invention may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, one or more programmable gate arrays (PGAs) could be used to implement one or more functions of the present invention. In yet another example, a combination of hardware and software could be used to implement one or more functions of the present invention.

Thus, a power system that can use multiple types of battery packs is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
  a first battery port to couple to a first type of battery pack having a first battery voltage range;
  a second battery port to couple to a second type of battery pack having a second battery voltage range that is different from the first battery voltage range;
  a first power rail to couple to a first set of loads that collectively operate with a higher efficiency in the first battery voltage range than the second battery voltage range;
  a second power rail to couple to a second set of loads that collectively operate with a higher efficiency in the second battery voltage range than the first battery voltage range; and
  a switch circuit having a plurality of switch settings, said plurality of switch settings comprising an increased efficiency setting to couple the first battery port to the first power rail and the second battery port to the second power rail, a second setting to couple the first battery port to both the first power rail and the second power rail, and a third setting to couple the second battery port to both the first power rail and the second power rail.

2. The apparatus of claim 1 further comprising:
  a DC power port to couple to a DC power source, said plurality of switch settings further comprising a fourth setting to couple the DC power port to both the first power rail and the second power rail.

3. The apparatus of claim 2 further comprising:
  a battery charger to couple the DC power port to the switch circuit, said plurality of switch settings further comprising a fifth setting to couple the battery charger to the first battery port and both the first power rail and the second power rail, and a sixth setting to couple the battery charger to the second battery port and both the first power rail and the second power rail.

4. The apparatus of claim 3 wherein the switch circuit comprises:
  a first switch;
  a second switch;
  a third switch;
  a fourth switch;
  a fifth switch;
  a sixth switch;
  a first node to couple to the battery charger, the first switch, the second switch, and the third switch;
  a second node to couple to the first battery port, the first switch, and the fourth switch;
  a third node to couple to the second battery port, the second switch, and the sixth switch;
  a fourth node to couple to the third switch, the fourth switch, the fifth switch, and the first power rail; and
  a fifth node to couple to the fifth switch, the sixth switch, and the second power rail.

5. The apparatus of claim 3 further comprising:
  control logic to select from among the plurality of switch settings, said control logic to
  select the increased efficiency setting when the DC power source is unavailable and both the first type of battery pack and the second type of battery pack are available and at least partially charged, select the second setting when the DC power source is unavailable, the second type of battery pack is unavailable or depleted, and the first type of battery pack is available and at least partially charged, select the third setting when the DC power source is unavailable, the first type of battery pack is unavailable or depleted, and the second type of battery pack is available and at least partially charged, select the fourth setting when the DC power source is available and each of the first type of battery pack and the second type of battery pack are unavailable or fully charged, select the fifth setting when the DC power source is available, the first type of battery pack is available and at least partially discharged, and the second type of battery pack is unavailable, fully charged, or waiting to be recharged, and select the sixth setting when the DC power source is available, the second type of battery pack is available and at least partially discharged, and the first type of battery pack is unavailable, fully charged, or waiting to be recharged.

6. The apparatus of claim 1 wherein the first type of battery pack comprises three battery cells in series, and the second type of battery pack comprises two battery cells in series.

7. The apparatus of claim 1 wherein the first power rail comprises a first power button switch to selectively couple the first set of loads to the switch circuit, and wherein the second power rail comprises a second power button switch to selectively couple the second set of loads to the switch circuit.

8. The apparatus of claim 1 further comprising:
a voltage monitor to monitor a voltage level on the first power rail, and to initiate a shut-down operation if the voltage level on the first power rail drops to a voltage droop threshold.

9. A method comprising:
configuring a switch circuit based on an availability of a first type of battery pack having a first battery voltage range, a second type of battery pack having a second battery voltage range that is different from the first battery voltage range, and a DC power source;
providing power through the switch circuit to a first set of loads coupled to a first power rail that collectively operate with a higher efficiency in the first battery voltage range than the second battery voltage range; and
providing power through the switch circuit to a second set of loads coupled to a second power rail that collectively operate with a higher efficiency in the second battery voltage range than the first battery voltage range.

10. The method of claim 9 wherein configuring the switch circuit comprises:
coupling a first battery port to the first power rail and a second battery port to the second power rail when the DC power source is unavailable at a DC power port, the first type of battery pack is available and at least partially charged at the first battery port, and the second type of battery pack is available and at least partially charged at the second battery port;
coupling the first battery port to both the first power rail and the second power rail when the DC power source is unavailable, the second type of battery pack is unavailable or depleted, and the first type of battery pack is available and at least partially charged;
coupling the second battery port to both the first power rail and the second power rail when the DC power source is unavailable, the first type of battery pack is unavailable or depleted, and the second type of battery pack is available and at least partially charged;
coupling the DC power port to both the first power rail and the second power rail when the DC power source is available and each of the first type of battery pack and the second type of battery pack are unavailable or fully charged;
coupling the DC power port to the first battery port and both the first power rail and the second power rail when the DC power source is available, the first type of battery pack is available and at least partially discharged, and the second type of battery pack is unavailable, fully charged, or waiting to be recharged; and
coupling the DC power port to the second battery port and both the first power rail and the second power rail when the DC power source is available, the second type of battery pack is available and at least partially discharged, and the first type of battery pack is unavailable, fully charged, or waiting to be recharged.

11. The method of claim 9 further comprising:
selectively decoupling the first set of loads from the first power rail, and the second set of loads from the second power rail, based on a state of a power button.

12. The method of claim 9 further comprising:
monitoring a voltage level on the first power rail; and
initiating a shut-down operation if the voltage level on the first power rail drops to a voltage droop threshold.

13. A machine readable medium having stored thereon machine executable instructions that, when executed, implement a method comprising:
configuring a switch circuit based on an availability of a first type of battery pack having a first battery voltage range, a second type of battery pack having a second battery voltage range that is different from the first battery voltage range, and a DC power source;
providing power through the switch circuit to a first set of loads coupled to a first power rail that collectively operate with a higher efficiency in the first battery voltage range than the second battery voltage range; and
providing power through the switch circuit to a second set of loads coupled to a second power rail that collectively operate with a higher efficiency in the second battery voltage range than the first battery voltage range.

14. The machine readable medium of claim 13 wherein configuring the switch circuit comprises:
coupling a first battery port to the first power rail and a second battery port to the second power rail when the DC power source is unavailable at a DC power port, the first type of battery pack is available and at least partially charged at the first battery port, and the second type of battery pack is available and at least partially charged at the second battery port;
coupling the first battery port to both the first power rail and the second power rail when the DC power source is unavailable, the second type of battery pack is unavailable or depleted, and the first type of battery pack is available and at least partially charged;
coupling the second battery port to both the first power rail and the second power rail when the DC power source is unavailable, the first type of battery pack is unavailable or depleted, and the second type of battery pack is available and at least partially charged;
coupling the DC power port to both the first power rail and the second power rail when the DC power source is available and each of the first type of battery pack and the second type of battery pack are unavailable or fully charged;

coupling the DC power port to the first battery port and both the first power rail and the second power rail when the DC power source is available, the first type of battery pack is available and at least partially discharged, and the second type of battery pack is unavailable, fully charged, or waiting to be recharged; and coupling the DC power port to the second battery port and both the first power rail and the second power rail when the DC power source is available, the second type of battery pack is available and at least partially discharged, and the first type of battery pack is unavailable, fully charged, or waiting to be recharged.

15. The machine readable medium of claim 13, the method further comprising:

selectively decoupling the first set of loads from the first power rail, and the second set of loads from the second power rail, based on a state of a power button.

16. The machine readable medium of claim 13, the method further comprising:

monitoring a voltage level on the first power rail; and initiating a shut-down operation if the voltage level on the first power rail drops to a voltage droop threshold.

17. A system comprising:

a notebook computer; and a power system for the notebook computer, said power system including a first battery port to couple to a first type of battery pack having a first battery voltage range;

a second battery port to couple to a second type of battery pack having a second battery voltage range that is different from the first battery voltage range;

a first power rail to couple to a first set of loads that collectively operate with a higher efficiency in the first battery voltage range than the second battery voltage range;

a second power rail to couple to a second set of loads that collectively operate with a higher efficiency in the second battery voltage range than the first battery voltage range; and a switch circuit having a plurality of switch settings, said plurality of switch settings comprising an increased efficiency setting to couple the first battery port to the first power rail and the second battery port to the second power rail, a second setting to couple the first battery port to both the first power rail and the second power rail, and a third setting to couple the second battery port to both the first power rail and the second power rail.

18. The system of claim 17 further comprising:

a DC power port to couple to a DC power source, said plurality of switch settings further comprising a fourth setting to couple the DC power port to both the first power rail and the second power rail.

19. The system of claim 18 further comprising:

a battery charger to couple the DC power port to the switch circuit, said plurality of switch settings further comprising a fifth setting to couple the battery charger to the first battery port and both the first power rail and the second power rail, and a sixth setting to couple the battery charger to the second battery port and both the first power rail and the second power rail.

20. The system of claim 19 further comprising:

control logic to select from among the plurality of switch settings, said control logic to select the enhanced efficiency setting when the DC power source is unavailable and both the first type of battery pack and the second type of battery pack are available and at least partially charged, select the second setting when the DC power source is unavailable, the second type of battery pack is unavailable or depleted, and the first type of battery pack is available and at least partially charged, select the third setting when the DC power source is unavailable, the first type of battery pack is unavailable or depleted, and the second type of battery pack is available and at least partially charged, select the fourth setting when the DC power source is available and each of the first type of battery pack and the second type of battery pack are unavailable or fully charged, select the fifth setting when the DC power source is available, the first type of battery pack is available and at least partially discharged, and the second type of battery pack is unavailable, fully charged, or waiting to be recharged, and select the sixth setting when the DC power source is available, the second type of battery pack is available and at least partially discharged, and the first type of battery pack is unavailable, fully charged, or waiting to be recharged.

21. The system of claim 17 further comprising:

a voltage monitor to monitor a voltage level on the first power rail, and to initiate a shut-down operation if the voltage level on the first power rail drops to a voltage droop threshold.

* * * * *